(12) United States Patent
Chelba et al.

(10) Patent No.: US 9,786,269 B2
(45) Date of Patent: Oct. 10, 2017

(54) LANGUAGE MODELING OF COMPLETE LANGUAGE SEQUENCES

(71) Applicant: Google Inc., Mountain View, CA (US)

(72) Inventors: Ciprian I. Chelba, Palo Alto, CA (US); Hasim Sak, New York, NY (US); Johan Schalkwyk, Scarsdale, NY (US)

(73) Assignee: Google Inc., Mountain View, CA (US)

( * ) Notice: Subject to any disclaimer, the term of this patent is extended or adjusted under 35 U.S.C. 154(b) by 875 days.

(21) Appl. No.: 13/875,406

(22) Filed: May 2, 2013

(65) Prior Publication Data

US 2014/0278407 A1    Sep. 18, 2014

Related U.S. Application Data

(60) Provisional application No. 61/781,140, filed on Mar. 14, 2013.

(51) Int. Cl.
*G10L 15/00* (2013.01)
*G10L 15/06* (2013.01)
*G10L 15/197* (2013.01)

(52) U.S. Cl.
CPC .......... *G10L 15/063* (2013.01); *G10L 15/197* (2013.01)

(58) Field of Classification Search
CPC ... G10L 13/08; G10L 15/1815; G10L 15/183; G10L 15/197; G10L 2015/081;
(Continued)

(56) References Cited

U.S. PATENT DOCUMENTS 5,293,584 A    3/1994   Brown et al.
5,457,768 A    10/1995  Tsuboi et al.
(Continued)

FOREIGN PATENT DOCUMENTS

EP    1475779 B1      1/2007
WO    WO0023983 A1    4/2000

OTHER PUBLICATIONS van Heerden et al., "Language Modeling for What-with-Where on GOOG-411," Proceedings of Interspeech 2009, Sep. 6, 2009, pp. 991-994.
(Continued)

*Primary Examiner* — Michael Colucci
(74) *Attorney, Agent, or Firm* — Fish & Richardson P.C.

(57) ABSTRACT

Methods, systems, and apparatus, including computer programs encoded on a computer storage medium, for language modeling of complete language sequences. Training data indicating language sequences is accessed, and counts for a number of times each language sequence occurs in the training data are determined. A proper subset of the language sequences is selected, and a first component of a language model is trained. The first component includes first probability data for assigning scores to the selected language sequences. A second component of the language model is trained based on the training data, where the second component includes second probability data for assigning scores to language sequences that are not included in the selected language sequences. Adjustment data that normalizes the second probability data with respect to the first probability data is generated, and the first component, the second component, and the adjustment data are stored.

20 Claims, 5 Drawing Sheets

(58) Field of Classification Search
CPC .......... G06F 17/2818; G06F 17/30684; G06F 17/2715; G06F 17/30265; G06F 17/3053; G06F 17/3064
USPC ..... 704/235, 260, 270.1, 275, 4, 9; 707/706, 707/723; 715/810
See application file for complete search history.

(56) References Cited

U.S. PATENT DOCUMENTS

| | | | |
|---|---|---|---|
| 5,613,036 A | 3/1997 | Strong | |
| 5,651,096 A | 7/1997 | Pallakoff et al. | |
| 6,167,377 A | 12/2000 | Gillick et al. | |
| 6,778,952 B2 | 8/2004 | Bellegarda | |
| 7,447,636 B1 | 11/2008 | Schwartz et al. | |
| 7,454,326 B2 | 11/2008 | Marcu et al. | |
| 7,756,708 B2 | 7/2010 | Cohen et al. | |
| 8,615,389 B1* | 12/2013 | Marcu ............... | G06F 17/2715 704/1 |
| 8,630,860 B1* | 1/2014 | Zhang ............... | G06F 17/30026 704/235 |
| 8,712,776 B2* | 4/2014 | Bellegarda ......... | G10L 13/08 704/258 |
| 8,825,466 B1* | 9/2014 | Wang ................. | G06F 17/2827 704/10 |
| 8,856,007 B1* | 10/2014 | Stuttle .............. | G06F 17/30899 704/258 |
| 8,977,536 B2* | 3/2015 | Och .................... | G06F 17/2818 704/2 |
| 9,043,205 B2* | 5/2015 | Mengibar .......... | G10L 15/265 704/231 |
| 2002/0123894 A1* | 9/2002 | Woodward ......... | G10L 15/22 704/260 |
| 2002/0198707 A1* | 12/2002 | Zhou ................. | G10L 17/26 704/231 |
| 2005/0071331 A1* | 3/2005 | Gao .................. | G06F 17/30471 |
| 2005/0228640 A1* | 10/2005 | Aue ................... | G06F 17/2881 704/9 |
| 2008/0091443 A1 | 4/2008 | Strope et al. | |
| 2011/0060587 A1* | 3/2011 | Phillips ............. | G10L 15/30 704/235 |
| 2012/0016678 A1* | 1/2012 | Gruber .............. | G06F 17/3087 704/275 |
| 2012/0022872 A1* | 1/2012 | Gruber .............. | G06F 17/279 704/270.1 |
| 2012/0158705 A1* | 6/2012 | Konig ............... | G06F 17/30265 707/723 |
| 2012/0271631 A1 | 10/2012 | Weng et al. | |
| 2013/0019202 A1* | 1/2013 | Regan ............... | G06F 17/30867 715/810 |
| 2013/0086027 A1* | 4/2013 | Hebert .............. | G06F 17/3064 707/706 |

OTHER PUBLICATIONS

International Search Report and Written Opinion in International Application No. PCT/US2013/070732, mailed Jul. 30, 2014, 16 pages.
Mooney, Raymond J., "N-Gram Language Models," University of Texas at Austin, Feb. 2, 2012, 22 pages (accessed from the Internet on Feb. 19, 2013).
International Preliminary Report on Patentability in International Application No. PCT/US2013/070732, mailed Sep. 24, 2015, 12 pages.
Aubert, "An overview of decoding techniques for large vocabulary continuous speech recognition," Computer Speech and Language, Jan. 2002, 16(1):89-114.
Huang et al., "An Overview of the SPHINX-II Speech Recognition System," Proceedings ARPA Workshop on Human Language Technology, Mar. 1993, pp. 81-86.
Office Action in European Application No. 31798880, dated Oct. 5, 2016, 5 pages.

* cited by examiner

LANGUAGE MODELING OF COMPLETE LANGUAGE SEQUENCES

CROSS-REFERENCE TO RELATED APPLICATIONS

This application claims priority to U.S. Provisional Application No. 61/781,140, filed on Mar. 14, 2013. The entire contents of U.S. Provisional Application No. 61/781,140 are incorporated herein by reference.

BACKGROUND

Many speech recognition systems use language models to transcribe utterances. Language models are often trained using a set of training data that include examples of language usage. Typically, language models include statistical data about the words or other language units that make up utterances in the training data.

SUMMARY

In some implementations, a language model can store probability data for assigning scores to a defined set of language sequences. Each of the language sequences can be a complete user input sequence previously provided by one or more users, such as a complete phrase, a complete sentence, a complete query, or a complete text message. For each language sequence in the set, the language model can store a probability based on the frequency at which the language sequence occurs in its entirety in a set of training data. For example, the language model may store probabilities for particular complete language sequences that occur with a high frequency in the training data.

A computing system can use the language model in speech recognition, to assign a probability to a candidate transcription for an utterance. When the candidate transcription is one of the predetermined set of language sequences, the computing system can use the language model to assign a probability to the candidate transcription as a whole (e.g., using a stored probability corresponding to the candidate transcription), rather than calculating the probability based on, for example, multiple conditional probabilities for components (e.g., n-grams) of the candidate transcription.

In some implementations, a computing system can generate a hybrid language model that includes a first component and a second component. The first component can be trained to assign probability scores directly to language sequences in a predetermined set of language sequences (e.g., a set of the most common voice queries). The second component of the language model assigns probability scores based on another technique, such as n-gram modeling, in which conditional probabilities are used to build an overall probability for a language sequence. When the hybrid language model is used, the first component is used to assign probability scores to the language sequences included in the set of high-frequency language sequences. The second component is used to assign probabilities to language sequences that are not in the predetermined set of language sequences.

One innovative aspect of the subject matter described in this specification is embodied in methods that include the actions of: accessing training data indicating a variety of language sequences; determining a relative frequency of occurrence of the respective language sequences in the training data; selecting a proper subset of the language sequences; training a first component of a language model, the first component including first probability data for assigning scores to the selected language sequences; training a second component of a language model based on the training data, the second component including second probability data for assigning scores to language sequences that are not included in the selected language sequences; determining adjustment data that normalizes the first probability data and the second probability data; and storing the first component, the second component, and the adjustment data.

Another innovative aspect of the subject matter described in this specification is embodied in methods that include the actions of: accessing training data indicating a variety of language sequences; determining a relative frequency of occurrence of the respective language sequences in the training data; selecting a proper subset of the language sequences; training a first component of a language model, the first component including first probability data for assigning scores to the selected language sequences; determining adjustment data that normalizes the second probability data of a second component of the language model relative to the first probability data; and storing the first component, the second component, and the adjustment data.

Another innovative aspect of the subject matter described in this specification is embodied in methods that include the actions of: accessing training data indicating queries submitted by one or more users; determining, for each of the queries, a count of a number of times the training data indicates the query was submitted; selecting a proper subset of the queries based on the counts; training a first component of a language model based on the counts, the first component including first probability data indicating relative frequencies of the selected queries among the training data; training a second component of the language model based on the training data, the second component including second probability data for assigning scores to queries that are not included in the selected queries; determining adjustment data that normalizes the second probability data with respect to the first probability data; and storing the first component, the second component, and the adjustment data.

Another innovative aspect of the subject matter described in this specification is embodied in methods that include the actions of: receiving a first candidate transcription for one or more utterances; determining that the first candidate transcription is one of a predetermined set of language sequences associated with a first component of a language model; in response to determining that the candidate transcription is one of the predetermined set of language sequences associated with a first component of the language model, determining a first score for the first candidate transcription using the first component of the language model; evaluating the first candidate transcription based on the first score; receiving a second candidate transcription for the one or more utterances; determining that the second candidate transcription is not one of the predetermined set of language sequences associated with the first component of the language model; in response to determining that the candidate transcription is not one of the predetermined set of language sequences associated with the first component of a language model, determining a second score for the second candidate transcription using the second component of the language model; and evaluating the second candidate transcription based on the second score.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, training the first component of the language model based on the counts includes generating a first probability distribution over a set of possible outcomes limited to the queries occurring in the training data. Training the second component of the language model based on the training data includes generating a second probability distribution for which the range of possible outcomes is not limited to a defined set of queries. Determining the adjustment data includes determining one or more weighting values for weighting the second probability distribution relative to the first probability distribution to form combined probability distribution. Accessing training data indicating queries submitted by one or more users includes accessing one or more query logs indicating voice queries spoken by different users. Selecting the proper subset of the queries based on the counts includes selecting queries having the highest counts. Selecting the proper subset of the queries based on the counts includes selecting queries having a count that equals or exceeds a minimum threshold value, the minimum threshold value being greater than one. Selecting the proper subset of the queries based on the counts includes: (i) selecting queries having a first number of terms based on a first threshold; and (ii) selecting queries having a second number of terms based on a second threshold, the second number of terms being different from the first number of terms, and the second threshold being different from the first threshold. Training the first component of the language model based on the counts includes determining, for each of the selected queries, a score indicating a relative frequency of occurrence of the selected query, as a complete query, in the training data.

These and other embodiments may each optionally include one or more of the following features. For instance, training the first component of the language model includes generating data indicating a first probability distribution for which a first sum of probabilities of occurrence of the selected queries is a first value. Training the second component of the language model includes generating data indicating a second probability distribution for which a second sum of probabilities of occurrence of the selected queries is a second value. Determining the adjustment data includes determining a weighting value based on the first value and the second value. Determining the adjustment data includes determining a weighting value to apply to output of the second component, the weighting value equalizing a portion of a probability distribution of the second component with a corresponding portion of a probability distribution of the first component.

These and other embodiments may each optionally include one or more of the following features. For instance, determining a first score for a particular query using the first component of the language model, determining a second score for the particular query using the second component of the language model, and determining that the first score and the second score do not satisfy a predetermined relationship. In response to determining that the first score and the second score do not satisfy the predetermined relationship, removing the particular query from the selected queries to generate an altered set of selected queries. After removing the particular query from the selected queries, determining second adjustment data based on the altered set of selected queries. Training the second component of the language model based on the training data includes training an n-gram model. Training the n-gram model includes determining conditional probabilities each indicating a probability of occurrence of a term given occurrence of one or more other terms. Training the second component of the language model based on the training data includes training the second component using a proper subset of the training data, the proper subset of the training data excluding instances of the selected queries.

These and other embodiments may each optionally include one or more of the following features. For instance, accessing training data indicating queries submitted by one or more users includes (i) accessing first training data indicating first queries associated with a first geographical area and (ii) accessing second training data indicating second queries associated with a second geographical area that is larger than the first geographical area. Determining, for each of the queries, a count of the number of times the training data indicates the query was submitted includes determining, for each of the first queries, a count of a number of times the first training data indicates the query was submitted. Selecting the proper subset of the queries based on the counts includes selecting queries from among the first queries associated with the first geographical area. Training the first component of the language model based on the counts includes training the first component based on the counts indicating the number of times the first training data indicates that the selected queries were submitted. Training the second component of the language model based on the training data includes training the second component of the language model based on the second training data indicating queries associated with the second geographical area.

These and other embodiments may each optionally include one or more of the following features. For instance, receiving a query, determining that the received query is associated with the first geographical area, and in response to determining that the received query is associated with the first geographical area, selecting the first component from among a plurality of language models corresponding to different geographical areas. Using the first component to evaluate one or more candidate transcriptions that are included in the selected queries, and using the second component to evaluate one or more candidate transcriptions that are not included in the selected queries. Receiving a candidate transcription for one or more utterances; determining that the candidate transcription is one of the selected queries; in response to determining that the candidate transcription is one of the selected queries, determining a score for the candidate transcription using the first component of the language model; and evaluating the candidate transcription based on the score. Receiving a candidate transcription for one or more utterances; determining that the candidate transcription is not one of the selected queries; in response to determining that the candidate transcription is not one of the selected queries, determining a score for the candidate transcription using the second component of the language model; and evaluating the candidate transcription based on the score.

Advantageous implementations can include one or more of the following features. The speed and accuracy of speech recognition may be improved. The perplexity of a language model can be reduced. For at least some language sequences, the probabilities indicated by a language model can reflect the frequency of occurrence of the language sequences in training data better than an n-gram model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
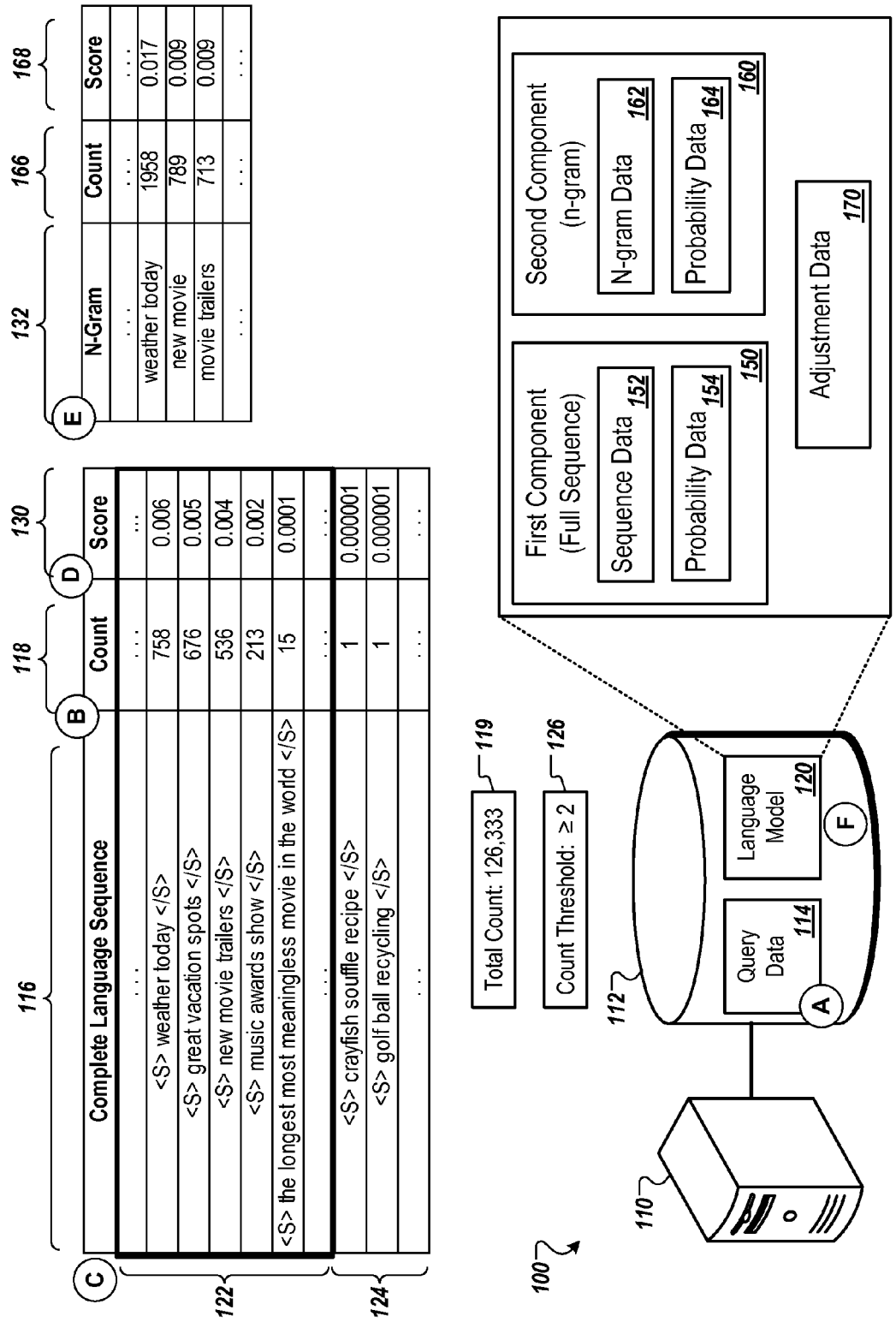
FIG. 1 is a diagram that illustrates an example of a system for training a language model.

FIG. 1 is a diagram that illustrates an example of a system 100 for training a language model 120. The system 100 includes a computing system 110 that communicates with one or more data storage devices 112. FIG. 1 also illustrates a flow of data, shown as stages (A) to (F), which represent a flow of data. Stages (A) to (F) may occur in the illustrated sequence, or in a sequence that is different from the illustrated sequence.

The computing system 110 can generate a language model 120 that includes two components, a first component that can assign scores to a defined set of language sequences, and a second component that can assign scores to any language sequence. The defined set of language sequences can be complete segments of language, such as full sentences or complete queries. For example, the set can be a set of high-frequency queries that occur in training data. The probability score that the first component assigns to a query can be based on the relative frequency that the query occurs in its entirety in the training data (e.g., as a user's entire query string, not as a portion or subset of a query). Because the first component assigns probabilities based on the actual frequency at which entire queries occur in the training data, the first component may predict the likelihood of occurrence of the high-frequency queries better than other types of language models, such as n-gram models.

The second component can be a language model that can assign probabilities to the high-frequency queries as well as other queries. For example, the second component may be capable of assigning a probability (e.g., a non-zero probability) to any language sequence, for example, using the chain rule to combine multiple conditional probabilities. The second component may be, but is not limited to, an n-gram language model that generates a probability score for a language sequence based on conditional probabilities of n-grams in the language sequence.

When a language sequence is included in the defined set of high-frequency queries, the first component is used to output a probability score for the language sequence. When a language sequence is not in the defined set of high-frequency queries, the second component is used to output a probability score. Backing off from the first component to the second component can ensure that the language model can assign a probability score to any language sequence, beyond just the sequences that occur in the defined set for the first component or even in the training data.

In some uses of speech recognition, such as recognition of voice queries, typical language sequences are often short, typically between 3 to 5 words. In many instances, the expected length of a voice query is about three words. In addition, the distribution of queries by length can be heavily weighted toward queries of three words or less. In some data sets, queries of three words or less often make up 70% or more of the queries that a voice search engine receives. To improve recognition, the language model 120 discussed below can store probabilities for entire queries. In addition, storing probabilities for only a defined subset of queries encountered during training can result in a language model 120 that uses less storage space than, for example, an n-gram model where n is, for example, three, four, or higher.

During stage (A), the computing system 110 accesses training data 114, which will be used to train, e.g., generate or update, the language model 120. The training data 114 includes a variety of different language sequences.

In the illustrated example, the training data 114 is query data that indicates queries 116 submitted by users. For example, the training data 114 may include one or more query logs that indicate queries submitted by any of multiple users over a particular time period, such as one week, one month, one year, etc. The training data 114 may indicate queries submitted by users in a particular geographical area, or queries in a particular language.

In some implementations, the query data indicates queries of a particular type or queries from a particular source, for example, voice queries (e.g., queries input to a device as utterances of users). In some implementations, the voice queries are queries detected by devices in a particular class or category of device, such as mobile devices (e.g., phones, smartphones, or other hand held devices). The voice queries may be queries input at devices produced by one or more particular manufacturers, or queries input at devices of one or more particular models.

In some implementations, the training data 114 is standardized. For example, the text of the queries can be adjusted to a common format, misspellings may be corrected, plurals can be changed to singular and vice versa, etc.

During stage (B), the computing system 110 determines the frequency that the various language sequences, e.g., the queries 116, occur in the training data 114. In the illustrated example, the computing system 110 determines counts 118 representing the number of times that the respective queries 116 were submitted. For example, the computing system 110 identifies the different queries 116 indicated by the training data 114, and counts the number of instances of each query 116 in the training data 114.

The queries 116 are illustrated as including a sequence beginning marker, "<S>," and a sequence ending marker, "</S>." These indicators show that the queries 116 are entire queries, each representing a user's entire query string, and do not represent substring portions of queries. The computing system 110 can parse the training data 110 to determine appropriate positions of sequence beginnings and endings. For example, the computing system 110 may designate beginning and ending markers so that language sequences each encompass the entire text of an individual log entry, record, or message. In addition, or as an alternative, the computing system 110 may designate beginning and ending markers corresponding to the positions of predetermined punctuation symbols (e.g., periods, commas, or other delimiters), metadata, formatting characteristics, and so on. Other techniques for parsing the training data 114 may also be used.

Each count 118 represents the number of times that users have submitted the corresponding query in its entirety. For example, each count 118 indicates a number of times that users submitted a language sequence that includes all of the terms of the corresponding query 116, in the order the terms appear in the corresponding query 116, and without inclusion of any terms that are not included in the corresponding query 116 (e.g., without any additional terms before, after, or between the terms of the corresponding query 116).

In the illustrated example, the computing system 110 determines a count of 758 for the query "<S> weather today </S>," showing that the training data 114 indicates that this query was submitted 758 times. Similarly, the computing system 110 determines that the query "<S> great vacation spots </S>" was submitted 676 times, and so on.

The computing system 110 also determines a total count 119 of the number of query submissions (e.g., combined number of instances of all queries 116) indicated by the training data 114. The total count 119 is equal to the sum of all of the counts 118.

To determine the counts 118, the computing system 110 may count only non-overlapping text segments in the training data 114. Different queries 116 may include some of the same terms, but each particular text segment in the training data 114 only contributes to the count 118 for a single query 116. That is, when a segment of text in the training data 114 is counted as an instance of a query 116, no portion, e.g., substring, of that particular segment of text is used to increment the count 118 for any other query 116. For example, a particular segment of the training data 114 may include a query string including four terms, $w_1$ $w_2$ $w_3$ $w_4$. The computing system 110, when evaluating this portion of the training data 114, increments the count 118 for the corresponding query 116 that includes the four terms. The computing system 110 then moves on and evaluates the next text segment that occurs in the training data 114, without incrementing counts for other queries, such as $w_1$ $w_2$ $w_3$ or $w_2$ $w_3$ $w_4$, based on the particular text segment. This is different from the manner in which n-gram counts are typically determined for n-gram models. Generally, to determine n-gram counts, a sliding window is passed over text segments and n-grams are considered to occur at multiple overlapping positions of the sliding window. For n-gram counts, a single instance of a term in the training data may contribute to counts for multiple different n-grams.

During stage (C), the computing system 110 selects a set of language sequences from among the language sequences indicated by the training data 114. The computing system 110 can select language sequences based on one or more criteria. In some implementations, the computing system 110 selects language sequences based on the frequency of occurrence of the language sequences. For example, the computing system 110 can select the most frequently occurring language sequences (e.g., by selecting queries 116 with the highest counts 118). In addition, or as an alternative, language sequences can be selected based on length (e.g., number of terms or words in a language sequence), a geographical location associated with the language sequence, or other factors.

In the illustrated example, the computing system 110 selects a set 122 of the queries 116 based on the counts 118, where the set 122 is a proper subset of the queries 116. The selected set 122 includes the queries 116 that occur with the highest frequency in the training data 114.

In some implementations, the computing system 110 selects a predetermined number of the queries 116. For example, the computing system 110 can select N queries 116 having the highest counts 118, where N is a predetermined integer.

In some implementations, the computing system 110 selects queries 116 that have a count 118 that satisfies a count threshold 126. For example, the computing system 110 can select queries 116 that have a count 118 that meets or exceeds a minimum threshold value. The minimum threshold value can be, for example, two, five, ten, or another value. The queries 116 that do not satisfy count threshold 126, such as queries 116 shown in a set 124, are excluded from the selected set 122. In some implementations, queries 116 of any length may be selected if the corresponding count satisfies the count threshold. As a result, the queries 116 in the set 122 have different lengths, and some of the queries 116 in the set 122 may have a length of five, six, seven, or more terms.

In some implementations, the selected set 122 is selected based on the length of the queries 116 (e.g., a number of terms in each query) and/or other criteria. For example, the computing system 110 may select queries that include no more than a maximum number of terms (e.g., 20 terms, 15 terms, 10 terms, etc.). As an example, the computing system 110 may select queries 116 that occur in the training data 114 at least a minimum number of times and each include no more than a maximum number of terms.

In some implementations, the computing system 110 uses different count thresholds for queries 116 that include different numbers of terms. For example, the computing system 110 can select queries that include two terms and have counts of at least fifty, the computing system 110 can select queries that include three terms and have counts 118 of at least forty, and the computing system 110 can select queries that include four terms and have counts 118 of at least thirty. For queries 116 that include five or more terms, the computing system 110 can select queries that have counts 118 of at least fifteen. The count thresholds can be set so that queries with a higher number of terms have a lower count threshold, increasing the likelihood that longer queries are selected.

During stage (D), the computing system 110 generates a first component 150 of the language model 120. To generate the first component 150, the computing system 110 determines a score 130 for each of various language sequences. The score 130 can be a relative frequency of occurrence of a language sequence in the training data. The scores 130 indicate probabilities of occurrence of the various language sequences. The score 130 for a language sequence can be based on the frequency that the language sequence occurs in its entirety in the training data 114 as a discrete, complete user input sequence, and not based on conditional probabilities of occurrence of various subsets, e.g., n-grams, of the language sequence.

In the illustrated example, the computing system 110 generates the scores 130 based on the relative frequencies that the language sequences occur in the training data as complete queries. For example, the scores 130 are generated based on the counts 118, which indicate the number of times the respective queries 116 were submitted. The relative frequency of occurrence for a query 116 can be determined as the count 118 for the query 116 divided by the total count 119. As an example, for the query "<S> weather today </S>," the relative frequency can be determined as the corresponding count 118 (e.g., 758) divided by the total count 119 for all queries (e.g., 126,333). The relative frequency (e.g., 758/126,333=0.006) represents the probability that a random query selected from among the queries 116 will be the query "<S> weather today </S>."

As a result, the relative frequencies for the queries 116 form a probability distribution where the range of possible outcomes is limited to selection of one of the queries 116 occurring in the training data 114. Each relative frequency is the probability of occurrence of the corresponding query, out of the set of all the queries 116. The sum of the relative frequencies or probabilities for all queries 116 is one, indicating that the scores 130 indicate a proper distribution over the queries 116. In the illustrated example, the scores 130 are the relative frequencies or probabilities for the queries 116, however other techniques can be used to generate scores that indicate the probability distribution.

The computing system 110 generates the first component 150 to include scores 130 for only a proper subset of the queries 116. For many sets of training data, including data for every language sequence would result in an impractically large language model. To efficiently store data for queries that are likely to occur again, the computing system 110 stores scores 130 for only the selected queries 116 in the set 122. As discussed above, the queries 116 in the set 122 can be the most frequently occurring queries 116, or can be selected according to other criteria. The first component 150 does not include scores for queries 116 outside the set 122.

In the illustrated example, scores 130 are illustrated for queries 116 in the set 124, indicating that these queries 116 are allocated a non-zero probability of occurrence in the probability distribution for the first component 150. Nevertheless, the computing system 110 does not need to calculate or store scores for the queries 116 in the set 124. To conserve storage space and reduce computational costs, the first component 150 may omit data identifying the queries 116 in the set 124 and include scores 130 for the queries in the set 124.

The first component 150 includes sequence data 152 that indicates the queries 116 in the set 122, e.g., a list of the highest-frequency queries 116 in the training data 114. The first component 150 also includes probability data 154 that indicates a portion of the probability distribution for the queries 116 occurring in the training data. As indicated above, the probability data 154 includes scores 130 for the queries 116 in the set 122, and not for queries outside the set 122. As a result, the first component 150 is only used to queries 116 in the set 122.

When the first component 150 is used to evaluate a language sequence that occurs in the predetermined set, the first component 150 can provide a score that indicates a probability of occurrence of the language sequence as a complete user input sequence or submission, e.g., not as a portion or proper subset of a larger language sequence. As an example, an entire query string of a query submitted by a user can be a complete user submission. Another example of a complete user submission is the entirety of a message, such as a short message service (SMS) text message, an e-mail message, or a social networking post or status update. Because user submissions often include differing numbers of terms, the language sequences in the predetermined set can include different numbers of terms.

In addition, or as an alternative, each language sequence can be a complete sentence, or other defined segment of natural language. For example, the language sequences can be, for example, sentence fragments, complete phrases, complete sentences, or complete paragraphs within training data. The boundaries of a complete language sequence can be indicated by, for example, punctuation, grammar, formatting, metadata, and/or other factors. For example, a period, question mark, exclamation mark, or other punctuation may indicate the end of a language sequence and the end of a language sequence and/or beginning of a new language sequence. Similarly, the beginning and end of a document, or beginning and end of a section within a document can indicate the beginning and end of a language sequence. For language sequences transcribed from utterances, complete language sequences may be delimited by a period of silence or noise (e.g., a pause in dictation) of at least a minimum duration. Accordingly, in a dictation setting, a transcription for utterances occurring between silences of a predetermined duration can be considered a complete language sequence.

During stage (E), the computing system 110 generates a second component 160 of the language model 120. The range of possible outcomes, e.g., different language sequences with non-zero probability of occurrence, for the second component 160 is not limited to the queries 116 in the set 122, or in some implementations, to any predetermined set. As a result, the second component 160 may be used to assign scores to a larger set of language sequences than the first component 150. The second component 160 can be configured to assign a score to any language sequence, including the queries 116 in the set 122, queries 116 in the set 124, and queries that do not occur in the training data 114.

Because the first component 150 includes scores 130 for only the queries 116 in the set 122, the second component 160 is needed so that the language model 120 can assign a score to other language sequences. For example, for effective use in speech recognition, the language model 120 may need to be able to assign scores to any of the queries 116, to proper subsets of the terms in a query 116, and to language sequences that did not occur in the training data. The second component 160 provides the flexibility to allow the language model 120 to assign a score to a larger set of language sequences than those stored in the first component 150. As discussed below, the second component 160 can assign scores to all of the queries 116 in the set 122, as well as others. This ability can be used to calibrate the language model 120 as discussed further below.

The second component 160 can be an n-gram model, e.g., unigram model, bigram model, trigram model, etc. For example, the second component 160 can include n-gram data 162 that identifies a set of n-grams 132 occurring within the training data 114. The second component 160 also includes probability data 164 that can be used to assign scores to language sequences composed of one or more of the n-grams. For example, the probability data 164 can indicate conditional probabilities that indicate the probability of occurrence of a particular term given the previous occurrence of one or more other terms in a sequence.

In the illustrated example, the computing system 110 generates a bigram model based on the queries 116. Each of the n-grams 132 is a bigram (e.g., an n-gram where n is two). In some implementations, the second component 160 can include data about n-grams for multiple values of n, for example, including data about probabilities for unigrams, bigrams, and trigrams.

The computing system 110 identifies various bigrams within the queries 116. For example, the query "new movie trailers" includes the bigrams "new movie" and "movie trailers." The computing system 110 then determines n-gram counts 166 of the number of times that the respective bigrams occur in the training data 114.

Unlike the counts 118, the n-gram counts 166 do not necessarily indicate only the number of times the corresponding n-gram 132 occurs as a complete query 116. Rather, each count 166 indicates the number of times the corresponding n-gram 132 appears at any position within a query 116, even if the n-gram 132 is only a portion of a larger query. For example, the query "<S> new movie trailers </S>" occurs 536 times in the training data 114 as a complete query, but the bigram "new movie" occurs a greater number of times. This is because the n-gram count 166 for the bigram "new movie" also reflects instances of the bigram in all queries 116, including queries such as "new movie showtimes," "new movie reviews," "tickets new movie," and so on. Similarly, while the exact query "<S> weather today </S>" occurs 758 times in the training data 114, the n-gram count 166 for the bigram "weather today" is 1958. This is because the n-gram count 166 includes instances of the bigram within queries such as "<S> weather today new york </S>" and "<S> weather today boston </S>," while those instances are excluded from the count 118 because they are not instances of "<S> weather today </S>" as a complete query. In other words, the language sequence boundaries, e.g., indicated by <S> and </S>, for queries that include the bigram do not necessarily align with the language sequence boundaries for the full query including the same terms as the bigram.

Using the n-gram counts 166, the computing system 110 determines conditional probabilities for the n-grams 132. For example, the computing system 110 determines scores 168 that indicate a probability that the last term of an n-gram 132 will occur, given the occurrence of the preceding term(s) in the n-gram 132. For example, for the bigram "new movie," the corresponding score 168 can indicate a probability that, given the occurrence of the term "new," the next term in a language sequence will be "movie."

When the second component 160 is used to evaluate a language sequence, the computing system 110 or other system can use the scores 168 to determine a probability for a language sequence composed of various n-grams 132. For example, due to the chain rule, the product of multiple conditional probabilities for the various n-grams 132 that occur in a language sequence can represent the probability of occurrence of the language sequence.

The computing system 110 can use any of various smoothing techniques when generating the second component 160. For example, the counts 166, the scores 168, or other parameters can determined to permit the n-gram component 160 to assign a probability to any language sequence, even if the language sequence does not appear in the training data 114.

In some implementations, the computing system 110 generates the second component 160 using all of the training data 114. In some implementations, the computing system 110 generates the second component 160 using only a portion of the training data 114, for example, the training data 114 excluding instances of the queries 116 selected for the set 122.

During stage (F), the computing system 110 generates adjustment data 170 that calibrates the language model 120. The adjustment data 170 can adjust the output of the second component 160 to be more consistent with the output of the first component 150. For example, the adjustment data 170 can cause the total probability that the second component 160 assigns to the queries in the set 122 to be equal to the total probability that the first component 150 assigns to the same queries. In this manner, the adjustment data 170 can ensure that the total probability for all the queries 116 in the training data 114 equal one.

In the probability distribution for the first component 150, the scores 130 indicate that the probabilities or relative frequencies of all queries 116 occurring in the training data sum to 1. In the probability distribution for the second component 160, the scores 168 also indicate that probabilities for all queries 116 occurring in the training data also sum to 1.

Of the total probability (e.g., 1) of each probability distribution, the two components 150, 160 may assign different fractions to the queries 116 in the set 122. For example, the probability data 164 may indicate that the sum of probabilities for the queries 116 in the set 122 is 0.75, or, that there is a 75% chance that a random query is one of the queries in the set 122. The remaining share of the probability distribution (e.g., 0.25) is the sum of probabilities for the queries 116 outside the set 122.

However, the sum of probabilities that the first component 150 provides for the queries 116 in the set 122 may be different. For example, the relative frequency of queries 116 in the training data 114 (e.g., the counts 118) may indicate that combined probabilities of the queries 116 in the set 122 is 80% rather than 75%. In this instance, the second component 160 overestimates the probabilities of the queries 116 outside the set 122, by allocating 25% of the probability distribution rather than the 20% that corresponds to their actual frequency of occurrence in the training data 114. To calibrate the second component 160, the computing system 110 may determine one or more weighting values to set the combined probabilities for the queries 116 outside the set 122 to 0.2, rather than 0.25.

For example, a weighting value can be determined that scales the probability scores produced by the second component 160. The computing system 110 can determine the total probability, P1, that the first component 150 assigns to the queries 116 in the set 122. For example, since the scores 130 in the illustrated example are the corresponding probabilities, the total can be the sum of the scores 130. As another example, the total probability can be the total number of instances of queries 116 in the set 122 (e.g., a sum of the counts 118 for the queries 116 in the set 122) divided by the total number of query instances in the training data 114 (e.g., the total count 119). The computing system 110 can also determine a total probability, P2, that the second component 160 assigns to the queries 116 in the set 122, for example, as a sum of the probability scores produced by the n-gram model for the queries 116 in the set 122. The weighting value can be determined as $(1-P1)/(1-P2)$ (e.g., $(1-0.8)/(1-0.75)=0.2/0.25=0.8$). The weighting value can then be multiplied with each probability score produced by the second component 160 to bring the probabilities in line with those of the first component 150.

With output of the second component 160 adjusted by the adjustment data 170, the language model 120 as a whole represents a proper probability distribution modeling the characteristics of the training data. For example, a sum of probabilities provided by the second component 160 for queries 116 outside the set 122, each scaled by the weighting value, plus a sum of probabilities provided by the first component 150 for queries 116 in the set 122 can equal one.

An example formulation for the language model 120 is indicated below. A query q is defined as $<S>w_1w_2 \ldots w_x</S>$, where <S> indicates a query beginning, </S> indicates a query end, and $w_1w_2 \ldots w_x$ are the terms of the query. The query q has an integer number of terms, x. The probability of occurrence of the query q is expressed as P(q), and may be calculated as shown below, in Equation 1:

$$P(q) = \begin{cases} f(q) & \text{if } q \in S \\ \alpha P_{n-gram}(q) & \text{otherwise} \end{cases}$$

In Equation 1, set S is a defined set of queries or other language sequences. In Equation 1, the term f(q) is the relative frequency of occurrence of the query q among the queries in the training data. In Equation 1, the term $P_{n-gram}$ (q) is the probability of occurrence of the query q indicated by an n-gram model or other model, e.g., the second component 160. In Equation 1, the term α is a weighting value that normalizes the model, e.g., adjustment data 170.

In some implementations, the set S is defined as the set of queries for which $C(q) \geq k_x$ and $x<M$, where: $C(q)$ is an absolute count of occurrences of the query q in the training data 114; $k_x$ is a count threshold value for queries having a number of terms equal to x; and M is an integer representing a maximum number of terms. In other implementations, the set S is defined based on other criteria, for example, based on a device associated with a language sequence or a geographical location associated with a language sequence.

In some implementations, the weighting value a is determined as shown below, in Equation 2:

$$\alpha = (1 - \Sigma_{q \in S} f(q))/(1 - \Sigma_{q \in S} P_{n\text{-}gram}(q)),$$

where $\Sigma_{q \in S} f(q)$ is the sum of the relative frequencies of occurrence of the queries in the set S (e.g., the sum can be equal to the probability that a random query from the training data is one of the queries in the set S), and $\Sigma_{q \in S} P_{n\text{-}gram}(q)$ is the sum of probabilities assigned to the queries in the set S by the n-gram model.

In some implementations, the computing system 110 prunes the first component 150 using the second component 160. After the second component 160 is generated, one or more of the queries 116 in the set 122 may be removed, reducing the size of the first component 150. For each query in the set 122, the computing system 110 can evaluate a probability score assigned by the first component 150 with respect to a probability score for the same query assigned by the second component 160. When the different components 150, 160 assign probabilities to a query, and the probabilities do not satisfy a desired relationship the query can be removed from the set 122. In some implementations, queries are removed from the set 122 when $f(q) < \lambda P_{n\text{-}gram}(q)$, where λ is a scaling factor. For example, λ may be equal to 1, indicating that queries 116 for which the second component 160 assigns a higher probability than the first component 150 are removed from the set 122.

After pruning, the computing system 110 may re-calculate various parameters of the language model 120. For example, when the set 122 changes, the computing system can re-calculate the adjustment data 170 to calibrate the second component 160 to the changed first component 150.

During stage (F), the computing system 110 stores the first component 150, the second component 160, and the adjustment data 170. The computing system 110 or another system can use the language model 120 to evaluate language sequences, such as candidate transcriptions for voice queries, as discussed further below.

In some implementations, using the combination of the first component 150 and the second component 160 reduces the perplexity of the language model 120, compared to an n-gram model alone. The combined or hybrid language model 120 may additionally increase accuracy in some implementations.

In some implementations, it may be useful to improve the ability of the language model 120 to predict the occurrence of language sequences that are common in a particular area. For example, some location-specific voice queries may be common in one city, for example, due to references to particular landmarks, attractions, or customs of the city, but may not be common elsewhere. The location-specific queries may have a high-frequency with respect to the total queries from the city, but may have a very low frequency with respect to queries received from the county, state, or country.

To improve prediction of queries from a particular geographical area, the first component 150 can be location-specific. The queries 116 in the set 122 can be selected based on the location from which the query was submitted. For example, the computing system 110 can select queries 116 that were submitted using a device located in a particular geographical area. The first component 150 can store the location-specific queries and corresponding probability scores. The probability scores for the location-specific queries can be based on a particular subset of training data having queries from the geographical area, in order to reflect the relative frequency among for that geographical area. When queries are received from the particular geographical area, the language-specific first component 150 can be used to assign probability scores. When a language sequence is not one of the location-specific queries, the computing system 110 can use a general model, such as an n-gram model trained using state-wide or nation-wide training data.

In some implementations, rather than training the second component 160 using the training data 114, the computing system 110 uses a different language model as the second component 160, for example, an existing language model, a language model trained by another system, or a language model trained using different training data 114. Any language model that can assign probability scores to the queries 116 in the set 122, as well as other queries, may be used as the second component 160. Because the first component 150 and the second component 160 each assign probabilities to the queries in the set 122, adjustment data 170 that normalizes the output of the second component 160 relative to the first component 150 can be determined as discussed above, regardless of how the second component is generated or what training data 114 is used. As a result, different sets of training data can be used to train the different components 150, 160.

While the example of FIG. 1 illustrates generating a language model based on queries, the same techniques can be used to generate a language model based on other types of language sequences. As an example, the training data 114 can indicate text messages, and the counts 118 can be counts of the number of times the respective text messages occur in their entirety. As a result, the sequence data 152 of the first component 150 can indicate a list of the most common text messages in the training data 114. The probability data 154 can indicate the probability of occurrence of the most common text messages, according to their respective frequency of occurrence in the training data. As another example, the sequence data 152 of the first component 150 can indicate the most common full sentences that occur in a set of training data, and the probability data 154 can indicate the probability of occurrence of the respective most common full sentences.

Figure 2:
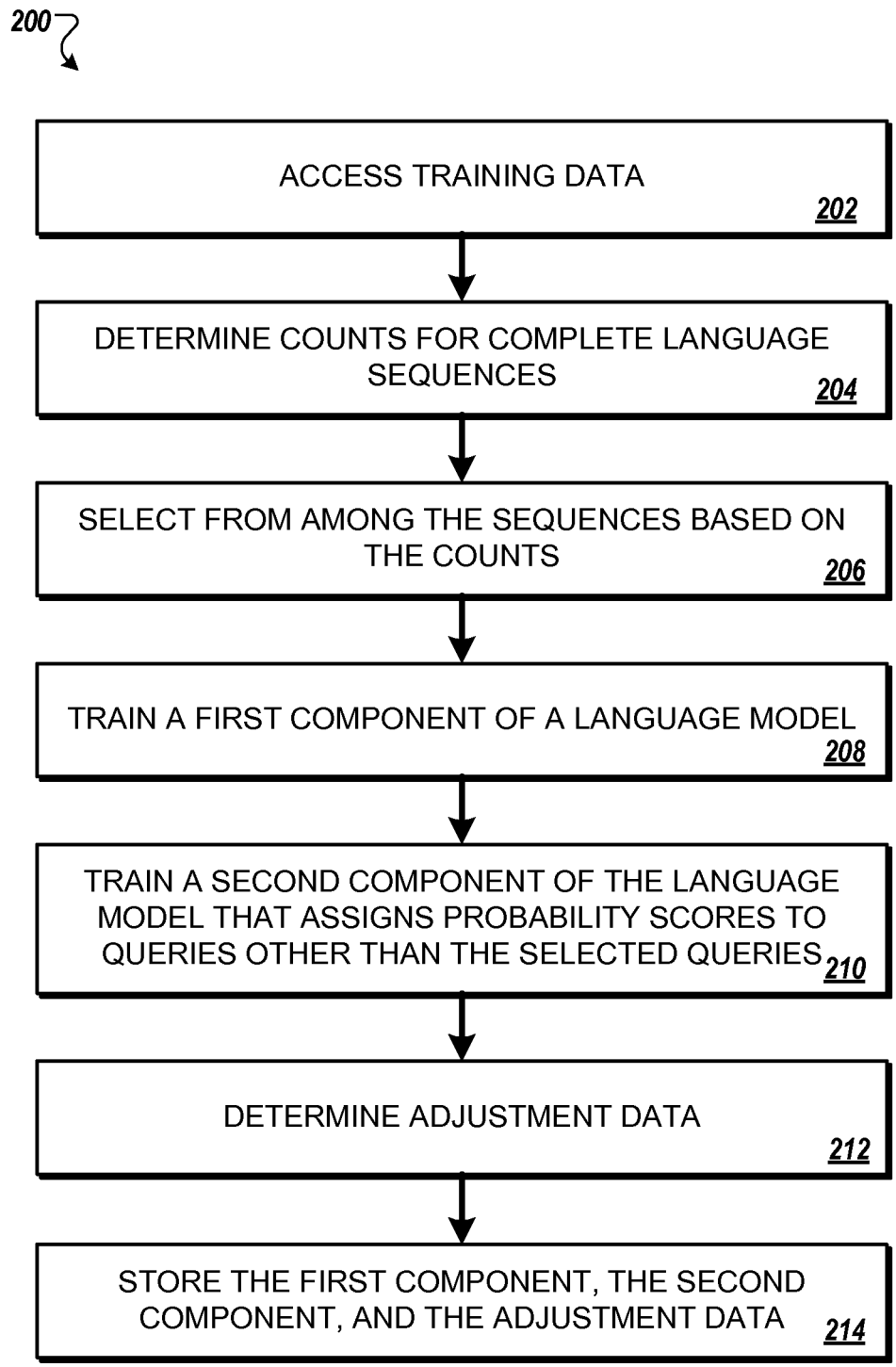
FIG. 2 is a flow diagram that illustrates an example of a process for training a language model.

FIG. 2 is a flow diagram that illustrates an example of a process 200 for training a language model. The process 200 is described as being performed by the computing system 110, but can be performed by one or more other computing devices, including combinations of multiple computing devices.

The computing system 110 accesses training data (202). The training data indicates multiple complete language sequences, for example, full sentences or complete submissions by users. In some implementations, the training data indicates queries submitted by one or more users. The training data can include query logs indicating voice queries spoken by different users.

The computing system 110 determines a count for each of the language sequences (204). For example, the computing system 110 determines, for each of a set of queries in the training data, a count of the number of times the training data indicates the query was submitted.

The computing system 110 selects a proper subset of the complete language sequences (206). For example, a proper subset of the language sequences, e.g., queries, in the training data are selected based on the counts. Language sequences that have a count that satisfies a count threshold can be selected. Language sequences having a count that equals or exceeds a minimum threshold value can be selected, and the minimum threshold value can be greater than one. As a result, the proper subset can include the language sequences, such as queries, that occur with highest frequency in the training data, e.g., have the highest counts.

In some implementations, queries having a first number of terms are selected based on a first threshold, and queries having a second number of terms are selected based on a second threshold. The second number of terms can be different from the first number of terms, and the second threshold can be different from the first threshold.

The computing system 110 trains a first component of a language model (208). The first model indicates probabilities based on relative frequencies of occurrence of the complete language sequences. For example, the first component can be trained based on the counts, and can include first probability data indicating relative frequencies that the selected language sequences, e.g. selected queries, occur in the training data.

In some implementations, the first component can include data that identifies the selected language sequences, e.g., a list of the language sequences in the proper subset. The first probability data can be a set of scores for the selected language sequences, where each score indicates a relative frequency of the corresponding query. In some implementations, training the first component includes determining, for each of a set of selected queries, a score indicating a relative frequency of occurrence of the selected query, as a complete query, in the training data.

The computing system 110 trains a second component of a language model (210). The second component can include second probability data for assigning scores to language sequences that are not included in the selected language sequences. For example, when the language sequences are queries, the second component can be capable of assigning scores to at least some queries in addition to selected queries for which the first component includes scores. In some instances, the second component may be configured to assign a score to any sequence of terms. The second component can also assign scores to each of the queries that the first component assigns scores, which facilitates calibration of the first component and the second component.

The second component can be an n-gram model. To train the n-gram model, the computing system 110 can determine conditional probabilities that each indicate a probability of occurrence of a term given occurrence of one or more other terms. The second component can be trained based on the training data as a whole, or based on a proper subset of the training data. For example, the proper subset of training data can exclude instances of the selected language sequences.

In some implementations, the second component is a standard back-off language model. The second component can assign a probability to any language sequence, including the selected language sequences. The second component can assign a probability to each of the selected language sequences, which permits the second component to be calibrated relative to the first component. The second component can assign probability incrementally, using the chain rule, e.g., that the probability of a sequence equals the product of conditional probabilities of sub-combinations of terms in the sequence, sometimes expressed as $P(w_1 \ldots w_n) = \Pi P(w_i | w_1 \ldots w_{\{i-1\}})$.

The computing system 110 determines adjustment data that normalizes the second probability data with respect to the first probability data (212). The adjustment data can be a weighting value to apply to output of the second component. The weighting value can equalize a portion of a probability distribution of the second component with a corresponding portion of a probability distribution of the first component. The adjustment data can equalize the share of probability that the second component assigns to language sequences other than the selected language sequences with the share of probability that the first component assigns to those sequences. The adjustment data can be generated by determining an aggregate share of probability that each of the first component and the second component allocate to the selected language sequences, and determining a weighting value based on the two different aggregate shares of probability. The computing system 110 stores the first component, the second component, and the adjustment data (214).

In some implementations, training the first component includes generating a first probability distribution over a set of possible outcomes limited to the language sequences (e.g., queries) occurring in the training data, and training the second component includes generating a second probability distribution for which the range of possible outcomes is not limited to a defined set of language sequences (e.g., queries). To determine the adjustment data, the computing system 110 can determine one or more weighting values for weighting the second probability distribution relative to the first probability distribution to form combined probability distribution. In the combined probability distribution, the sum of probabilities for the language sequences (e.g., queries) sums to 1.

In some implementations, training the first component of the language model includes generating data indicating a first probability distribution for which a first sum of probabilities of occurrence of the selected language sequences is a first value. Training the second component of the language model includes generating data indicating a second probability distribution for which a second sum of probabilities of occurrence of the selected language sequences is a second value. Determining the adjustment data includes determining a weighting value based on the first value and the second value.

In some implementations, the process 200 includes determining a first score for a particular query using the first component of the language model, determining a second score for the particular query using the second component of the language model, and determining that the first score and the second score do not satisfy a predetermined relationship. In response to determining that the first score and the second score do not satisfy the predetermined relationship, the particular query is removed from the selected queries to generate an altered set of selected queries. After removing the particular query from the selected queries, second adjustment data can be determined based on the altered set of selected queries.

In some implementations, accessing training data includes (i) accessing first training data indicating first language sequences associated with a first geographical area, e.g., a city, county, or state, and (ii) accessing second training data indicating second queries associated with a second geographical area that is larger than the first geographical area. For example, the second geographical area can include the first geographical area. The counts can be determined based on the first training data, and the selected language sequences can be selected from among the first queries associated with the first geographical area. The first language model can be trained based on the counts indicating the number of times the first training data indicates that the selected queries were submitted, and the second component of the language model can be trained based on the second training data indicating queries associated with the second geographical area, or based on the first training data and the second training data.

In some implementations, the computing system receives a query and determines that the received query is associated with the first geographical area. In response to determining that the received query is associated with the first geographical area, the computing system 110 selects the first component from among a plurality of language models or language model components corresponding to different geographical areas. The computing system 110 uses the first component to evaluate one or more candidate transcriptions that are included in the selected queries indicated by the first component, and uses the second component to evaluate one or more candidate transcriptions that are not included in the selected queries.

Figure 3:
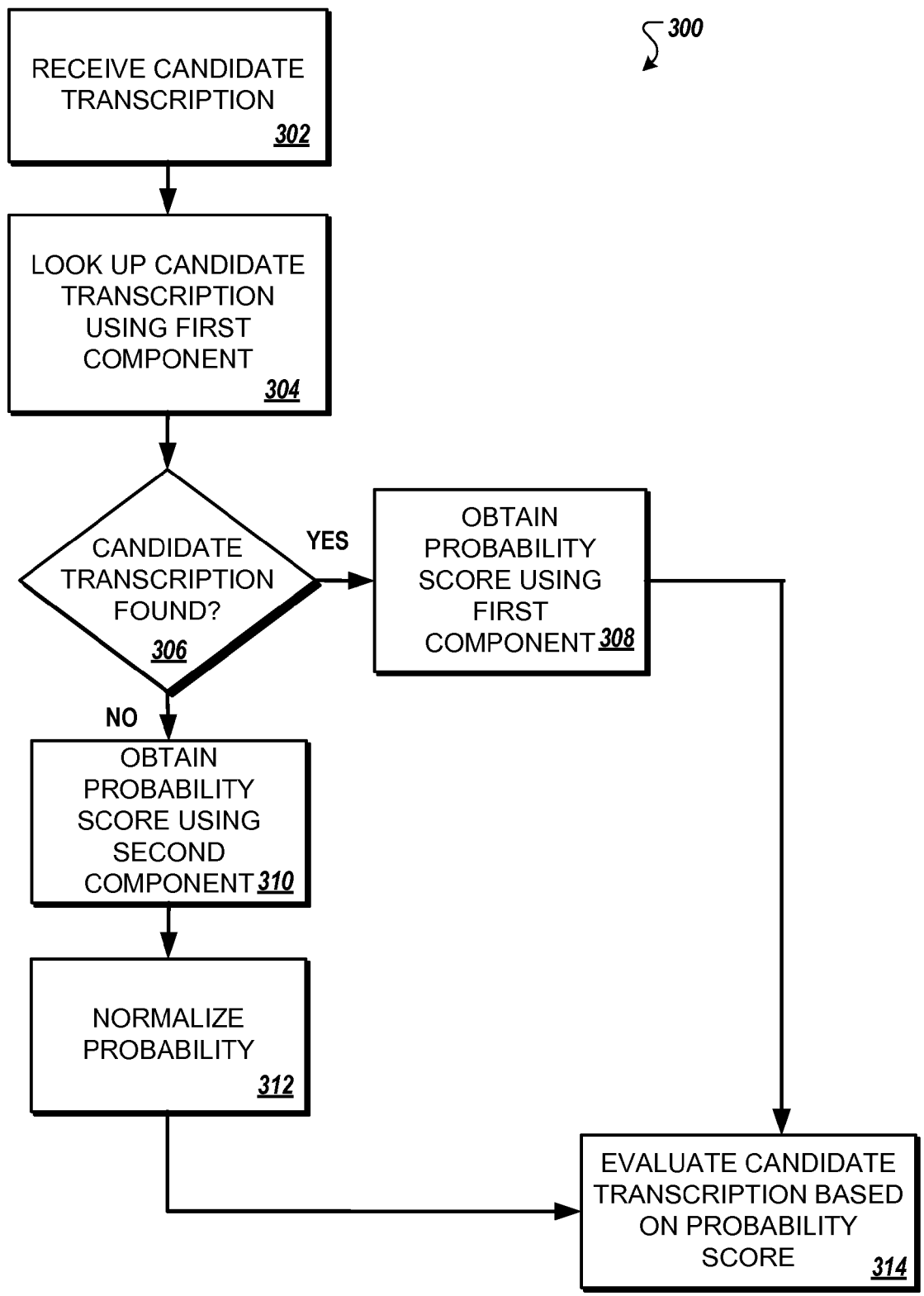
FIGS. 3-5 are flow diagrams that illustrate examples of processes for using a language model in speech recognition.

FIG. 3 illustrates a process 300 for evaluating a candidate transcription. The process 300 can be performed by one or more processing devices, for example, a server, a collection of multiple servers, a client device, a collection of processors within a client device, or a combination or sub-combination thereof. The process 300 is described as being performed by the computing system 110, but can be performed by other devices.

In the process 300, the computing system 110 receives a candidate transcription for one or more utterances (302). The computing system 110 looks up the candidate transcription in the first component of a language model (304). For example, the computing system 110 determines whether a list of language sequences included in the first component includes the candidate transcription. The computing system 110 determines whether the candidate transcription was found in the set of language sequences stored by the first component (306).

If the candidate transcription was found, the computing system 110 determines a probability score for the candidate transcription using the first component (308). If the candidate transcription was not found, the computing system determines a probability score for the candidate transcription using a second component of the language model (310). For example, the computing system 110 can "back off" to a generalized n-gram model. The computing system 110 normalizes the probability score from the second component (312), for example, by multiplying the probability score by a weighting value that calibrates the second component relative to the first component. The computing system 110 then evaluates the candidate transcription using the probability score (314), which is either a score from the first component or a normalized score from the second component.

Figure 4:
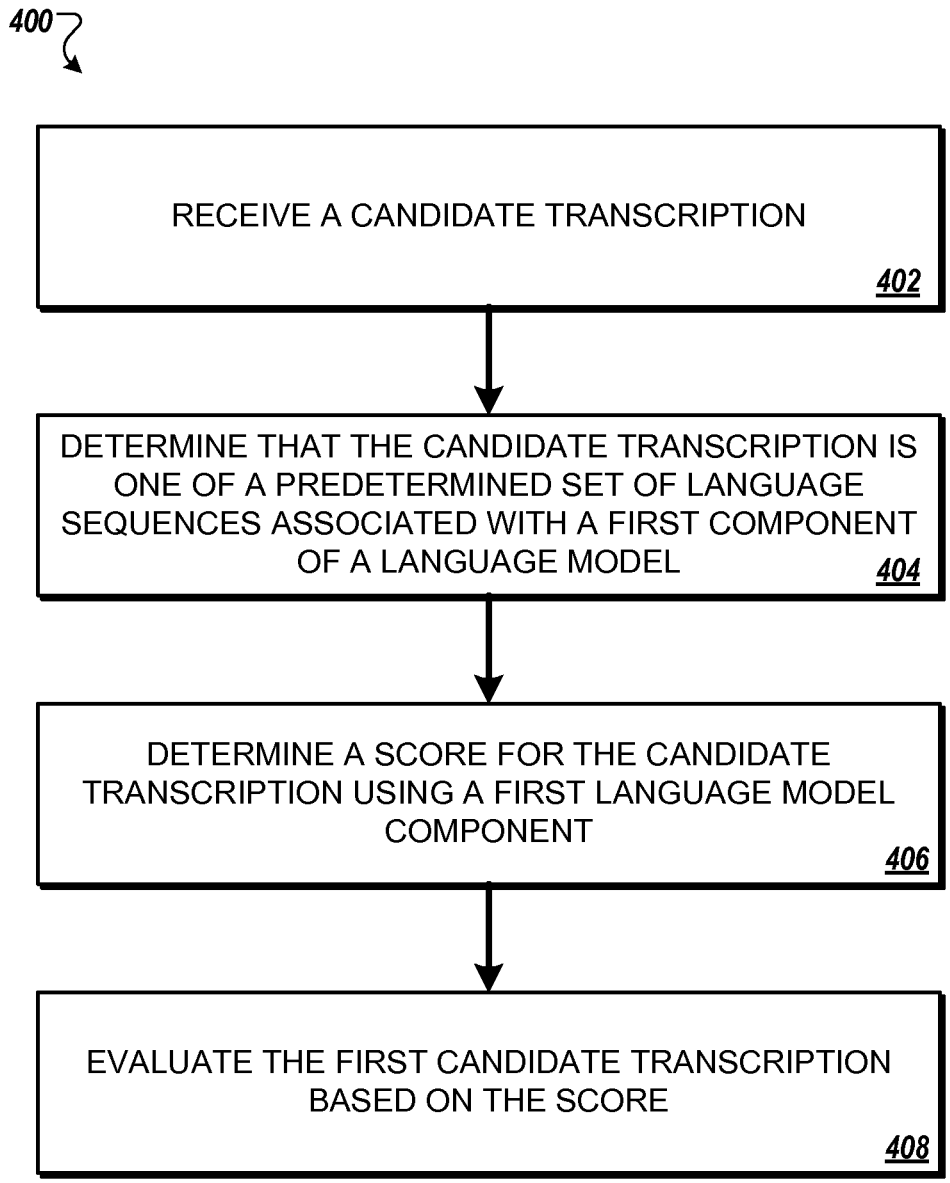

FIG. 4 illustrates a process 400 for evaluating a candidate transcription. The process 400 can be performed by one or more processing devices, for example, a server, a collection of multiple servers, a client device, a collection of processors within a client device, or a combination or sub-combination thereof. The process 400 is described below as being performed by the computing system 110, but the process 400 may be performed by other devices.

The computing system receives a candidate transcription for audio data containing one or more utterances (402). For example, the one or more utterances may include a voice query spoken by a user and detected by a microphone of a mobile device, such as a phone.

The computing system determines that the candidate transcription is one of a predetermined set of language sequences (404). The predetermined set of language sequences can be a set of language sequences stored in or otherwise associated with a first component of a language model that includes multiple components. For example, the computing system can determine that the first component of the language model stores a probability corresponding to the candidate transcription, indicating that the candidate transcription is one of the predetermined set of language sequences.

The first component of the language model can be trained to determine probabilities for each of the language sequences in the predetermined set. In some implementations, the first component is trained to determine probabilities only for the language sequences in the predetermined set. The first component may include data indicating respective probabilities of occurrence of the language sequences, determined based on respective counts of a number of times each language sequence occurs in training data as a complete language sequence (e.g., as a discrete submission by a user, such as a query or text message, rather than occurring as only a portion of a larger phrase). The first component can assign the probability for the candidate transcription as a whole, without building the probability using conditional probabilities of subsets (e.g., n-grams) of the candidate transcription.

The predetermined set language sequences can be complete language sequences that satisfy one or more thresholds for length and/or frequency of occurrence. For example, the predetermined set of language sequences can be a set of voice queries submitted by one or more users, where each of the voice queries occurs at least a minimum number of times in training data used to train the first component of the language model. The predetermined set language sequences can be complete language sequences submitted by one or more users, for example, complete text messages, complete e-mail messages, complete phrases, complete sentences, etc.

In some implementations, the predetermined set of language sequences includes language sequences of a variety of lengths. For example, the predetermined set of language sequences can include sequences that are respectively formed of one word, two words, three words, four words, and five words. In some implementations, one or more of the language sequences can include six or more words.

In response to determining that the candidate transcription is one of the predetermined set of language sequences, the computing system determines a score for the first candidate transcription using the first component of the language model (406). For example, the computing system 110 can access a stored probability based on the frequency of occurrence of the candidate transcription as a complete user input sequence in a set of training data.

The computing system 110 uses the score to evaluate the candidate transcription (408). For example, the computing system 110 can rank the first candidate transcription among a set of multiple candidate transcriptions based on the assigned score. The multiple candidate transcriptions can be, for example, a set of N candidate transcriptions having the highest likelihood of occurrence according to a first language model, where N is an integer, such as five, ten, twenty, fifty, etc. The computing system 110 may then re-score the multiple candidate transcriptions using scores determined using the hybrid model including the first component and second component described above. The computing system 110 can combine scores of multiple language models and/or acoustic models, and may rank the candidate transcriptions based on the combined scores.

Figure 5:
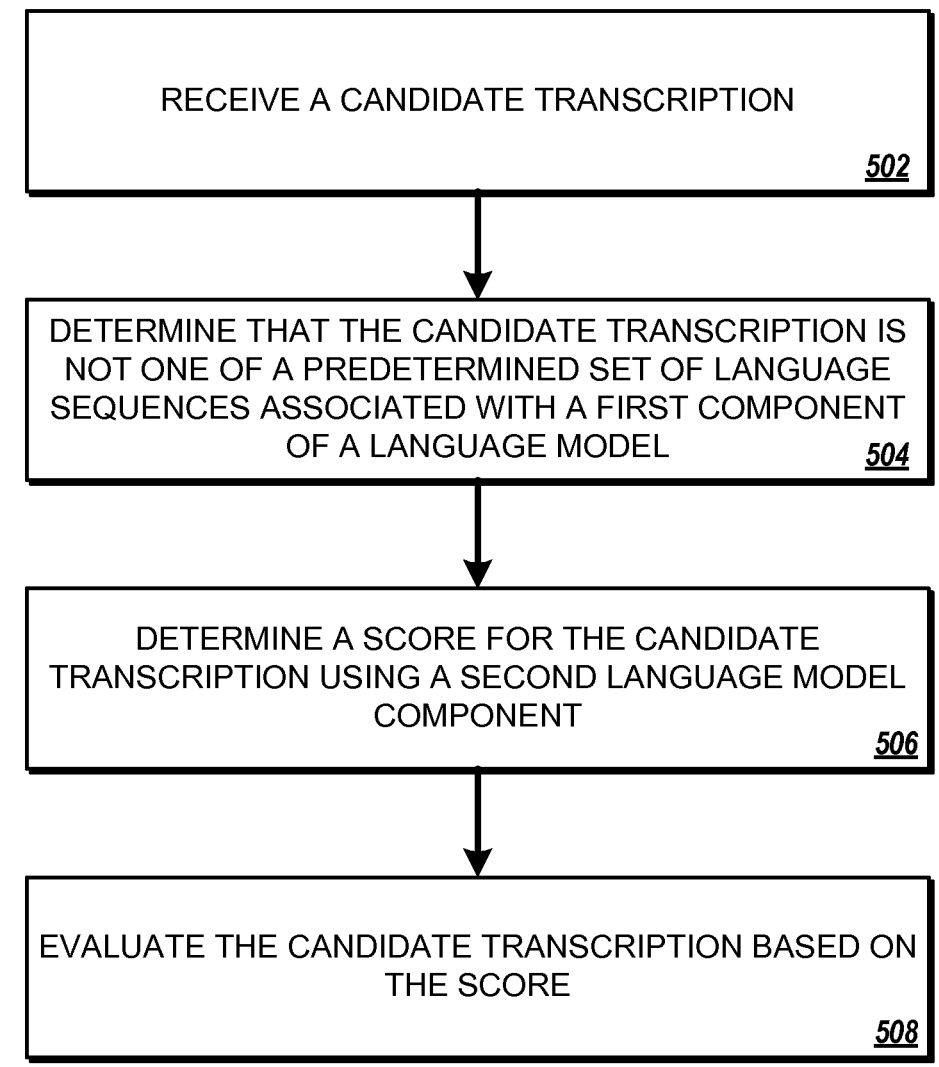

FIG. 5 illustrates a process 500 for evaluating a candidate transcription. The process 500 can be performed by one or more processing devices, for example, a server, a collection of multiple servers, a client device, a collection of processors within a client device, or a combination or sub-combination thereof. The process 500 is described below as being performed by the computing system 110, but the process 500 may be performed by other devices.

The computing system 110 receives a candidate transcription for audio data containing one or more utterances (502). The computing system 110 determines that the candidate transcription is not one of a predetermined set of language sequences (504). The predetermined set of language sequences can be a set for which a first language model component includes corresponding probability scores.

In response to determining that the candidate transcription is not one of the predetermined set of language sequences, the computing system 110 determines a score for the candidate transcription using a second language model component (506). The computing system 110 then evaluates the candidate transcription base on the score (508).

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
   accessing, by a data processing apparatus, training data indicating queries submitted by one or more users;
   determining, by the data processing apparatus and for at least some of the queries, a count of a number of times the training data indicates the query was submitted;
   selecting, by the data processing apparatus, a proper subset of the queries based on the counts;
   training, by the data processing apparatus, a first component of a language model based on the counts, the first component including first probability data indicating relative frequencies of the selected queries among the training data;
   training, by the data processing apparatus, a second component of the language model based on the training data, the second component including second probability data for assigning scores to queries that are not included in the selected queries;
   determining, by the data processing apparatus, adjustment data that includes one or more weighting values for normalizing the second probability data with respect to the first probability data; and
   storing, by the data processing apparatus, the first component, the second component, and the adjustment data.

2. The method of claim 1, wherein training the first component of the language model based on the counts comprises generating a first probability distribution over a set of possible outcomes limited to the queries occurring in the training data; and
   wherein training the second component of the language model based on the training data comprises generating a second probability distribution for which the range of possible outcomes is not limited to a defined set of queries.

3. The method of claim 2, wherein the one or more weighting values represent weights for weighting the second probability distribution relative to the first probability distribution to form a combined probability distribution.

4. The method of claim 1, wherein accessing training data indicating queries submitted by one or more users comprises accessing one or more query logs indicating voice queries spoken by different users;
   wherein selecting the proper subset of the queries based on the counts comprises selecting queries having the highest counts.

5. The method of claim 1, wherein selecting the proper subset of the queries based on the counts comprises selecting queries having a count that equals or exceeds a minimum threshold value, the minimum threshold value being greater than one.

6. The method of claim 1, wherein selecting the proper subset of the queries based on the counts comprises:
   selecting queries having a first number of terms based on a first threshold; and
   selecting queries having a second number of terms based on a second threshold, the second number of terms being different from the first number of terms, and the second threshold being different from the first threshold.

7. The method of claim 1, wherein training the first component of the language model based on the counts comprises determining, for each of the selected queries, a score indicating a relative frequency of occurrence of the selected query, as a complete query, in the training data.

8. The method of claim 1, wherein training the first component of the language model comprises generating data indicating a first probability distribution for which a first sum of probabilities of occurrence of the selected queries is a first value;
   wherein training the second component of the language model comprises generating data indicating a second probability distribution for which a second sum of probabilities of occurrence of the selected queries is a second value;
   wherein determining the adjustment data comprises determining a first weighting value based on the first value and the second value.

9. The method of claim 1, wherein a first weighting value of the one or more weighting values represents data for equalizing a portion of a probability distribution of the second component with a corresponding portion of a probability distribution of the first component.

10. The method of claim 1, further comprising:
determining a first score for a particular query using the first component of the language model;
determining a second score for the particular query using the second component of the language model;
determining that the first score and the second score do not satisfy a predetermined relationship; and
in response to determining that the first score and the second score do not satisfy the predetermined relationship, removing the particular query from the selected queries to generate an altered set of selected queries.

11. The method of claim 10, further comprising, after removing the particular query from the selected queries, determining second adjustment data based on the altered set of selected queries.

12. The method of claim 1, wherein training the second component of the language model based on the training data comprises training an n-gram model.

13. The method of claim 1, wherein training the second component of the language model based on the training data comprises training the second component using a proper subset of the training data, the proper subset of the training data excluding instances of the selected queries.

14. The method of claim 1, wherein accessing training data indicating queries submitted by one or more users comprises (i) accessing first training data indicating first queries associated with a first geographical area and (ii) accessing second training data indicating second queries associated with a second geographical area that is larger than the first geographical area;
wherein determining, for at least some of the queries, a count of the number of times the training data indicates the query was submitted comprises determining, for at least some of the first queries, a count of a number of times the first training data indicates the query was submitted;
wherein selecting the proper subset of the queries based on the counts comprises selecting queries from among the first queries associated with the first geographical area;
wherein training the first component of the language model based on the counts comprises training the first component based on the counts indicating the number of times the first training data indicates that the selected queries were submitted; and
wherein training the second component of the language model based on the training data comprises training the second component of the language model based on the second training data indicating queries associated with the second geographical area.

15. The method of claim 14, further comprising:
receiving a query;
determining that the received query is associated with the first geographical area;
in response to determining that the received query is associated with the first geographical area, selecting the first component from among a plurality of language models corresponding to different geographical areas;
using the first component to evaluate one or more candidate transcriptions that are included in the selected queries; and
using the second component to evaluate one or more candidate transcriptions that are not included in the selected queries.

16. The method of claim 1, further comprising:
receiving a candidate transcription for one or more utterances;
determining that the candidate transcription is one of the selected queries;
in response to determining that the candidate transcription is one of the selected queries, determining a score for the candidate transcription using the first component of the language model; and
evaluating the candidate transcription based on the score.

17. The method of claim 1, further comprising:
receiving a candidate transcription for one or more utterances;
determining that the candidate transcription is not one of the selected queries;
in response to determining that the candidate transcription is not one of the selected queries, determining a score for the candidate transcription using the second component of the language model; and
evaluating the candidate transcription based on the score.

18. The method of claim 1, further comprising using the language model in a speech recognition system to determine a candidate transcription of an utterance.

19. A system comprising:
one or more computers and one or more storage devices storing instructions that are operable, when executed by the one or more computers, to cause the one or more computers to perform operations comprising:
accessing, by the one or more computers, training data indicating queries submitted by one or more users;
determining, by the one or more computers and for at least some of the queries, a count of a number of times the training data indicates the query was submitted;
selecting, by the one or more computers, a proper subset of the queries based on the counts;
training, by the one or more computers, a first component of a language model based on the counts, the first component including first probability data indicating relative frequencies of the selected queries among the training data;
training, by the one or more computers, a second component of the language model based on the training data, the second component including second probability data for assigning scores to queries that are not included in the selected queries;
determining, by the one or more computers, adjustment data that includes one or more weighting values for normalizing the second probability data with respect to the first probability data; and
storing, by the one or more computers, the first component, the second component, and the adjustment data.

20. A non-transitory computer storage medium storing a computer program, the program comprising instructions that when executed by one or more computers cause the one or more computers to perform operations comprising:
accessing, by the one or more computers, training data indicating queries submitted by one or more users;
determining, by the one or more computers and for at least some of the queries, a count of a number of times the training data indicates the query was submitted;
selecting, by the one or more computers, a proper subset of the queries based on the counts;
training, by the one or more computers, a first component of a language model based on the counts, the first component including first probability data indicating relative frequencies of the selected queries among the training data;

training, by the one or more computers, a second component of the language model based on the training data, the second component including second probability data for assigning scores to queries that are not included in the selected queries;

determining, by the one or more computers, adjustment data that includes one or more weighting values for normalizing the second probability data with respect to the first probability data; and storing, by the one or more computers, the first component, the second component, and the adjustment data.

* * * * *